March 18, 1930. J. H. VIELE 1,751,371
WATER LOCKING SUCTION VALVE FOR HYDROCARBON FUEL STORAGE TANKS
Filed Feb. 11, 1929
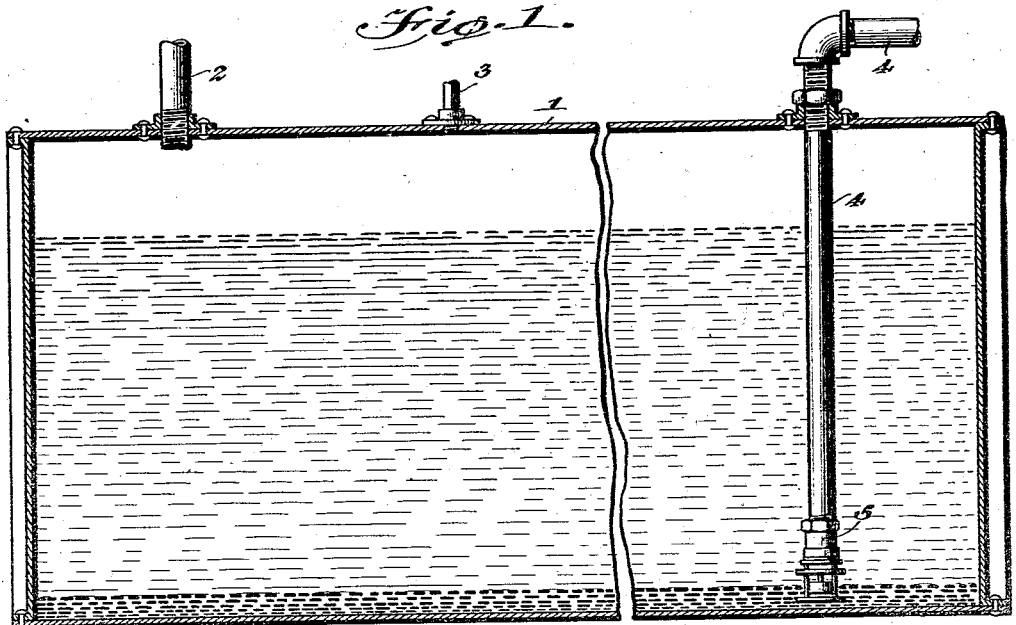
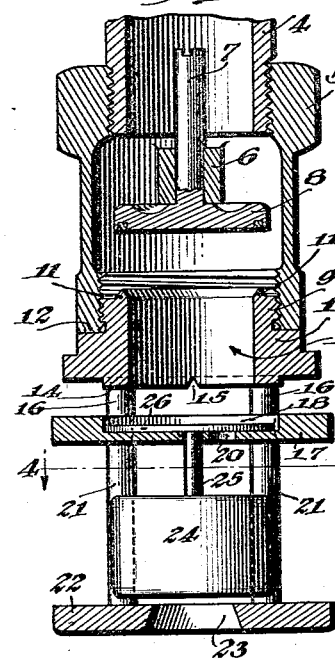
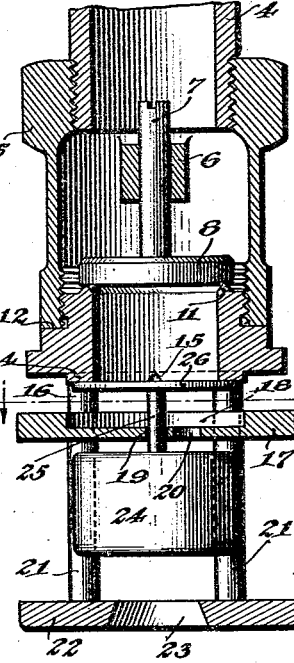
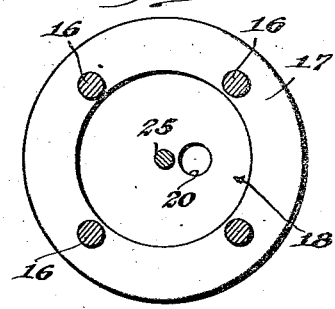
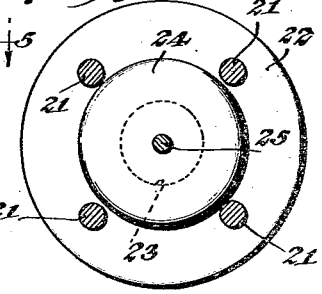
WITNESSES
INVENTOR
J. H. Viele,
BY
ATTORNEY Patented Mar. 18, 1930

1,751,371

UNITED STATES PATENT OFFICE

JOHN H. VIELE, OF ELMIRA, NEW YORK

WATER-LOCKING SUCTION VALVE FOR HYDROCARBON-FUEL-STORAGE TANKS

Application filed February 11, 1929. Serial No. 339,191.

This invention relates to hydrocarbon fuel storage tanks, and is more particularly concerned with a valve for attachment to the lower end of the suction pipe which extends from adjacent to the bottom of the tank to a discharge point such as the usual measuring and dispensing pump in use at retail gasoline stations.

The present invention constitutes an improved form of the valve for fuel storage tanks forming the subject matter of my pending application Serial No. 189,088.

In my said pending application and with the present invention, a float having a specific gravity making it buoyant in water, but causing it to sink in gasoline, for example, is utilized to close the lower intake end of the suction pipe to prevent the discharge therethrough by suction of water which accumulates in the bottom of such storage tanks.

Present day conditions in dispensing gasoline or other similar hydrocarbon fuel from storage tanks requires a high rate of discharge equivalent to fifty or more gallons per minute. The resultant strong suction acts from the bottom of the tank upwardly and will draw up into the suction pipe the layer of accumulated water at the bottom of the tank in admixture with gasoline unless proper means are taken to prevent this action.

In my copending application above referred to, a float valve sinking in gasoline but buoyant in water is housed in a casing attached to the lower end of the suction pipe and having vertically slotted sides, through which the gasoline is drawn until a bottom strata of water of sufficient depth has accumulated to lift the float sufficiently to cause the pumping suction to lift it to contact and close a valve seat at the lower end of the suction pipe and at the upper end of the slotted casing.

This arrangement operates satisfactorily with the average dispensing pump having a relatively slow rate of delivery compared to the newer pump installations having a much higher rate of gasoline discharge, such for example, as equivalent to the fifty gallons per minute above referred to. Under these last conditions, the suction created by such a pump is sufficient to lift the float to close the intake opening, before the accumulation of water normally would cause this action to take place.

In accordance with the present invention, I have provided a construction which protects the float from this strong suction and which provides and ensures a side intake by suction from above the float maintaining the float inactive to close the suction intake until such time as the float becomes buoyant through the accumulation of a strata of water at the bottom of the tank of sufficient depth at which time the suction becomes operative to lift the float bodily and close the suction intake. The invention consists in the structural features, combinations and arrangements of parts hereinafter pointed out and claimed and will be more clearly apparent in its construction and operation from the following detailed description which is to be read in conjunction with the accompanying drawings forming part hereof illustrating a preferable embodiment of the invention and in which:—

Figure 1 is a longitudinal sectional view of a gasoline storage tank having the water closing valve of my invention applied to the lower end of the suction pipe thereof;

Figure 2 is a longitudinal vertical section of the water locking valve as attached to the lower end of the check valve casing usually provided at the lower end of suction pipes of storage tanks, the float and its valve being shown in lowered position;

Figure 3 is a similar sectional view with the float and its valve lifted as by immersion of its float in water to cause the suction intake to the suction pipe to act thereagainst and lift it to its seat.

Figure 4 is a horizontal transverse section through the float cage taken on the line 4—4 of Figure 2.

Figure 5 is a horizontal sectional view through the valve casing looking down upon the recessed face of the baffle plate, the section being taken on the line 5—5 of Figure 3.

In the drawings, a storage tank 1 for hydrocarbon fuel, hereinafter referred to as gasoline, of conventional form is shown with the conventional filler pipe 2, vent pipe 3 and a suction pipe 4 extending upwardly through the tank from adjacent its bottom to a discharge point, represented, for instance, by the dispensing pump used in retail gasoline stations. This suction pipe is provided with a check valve therein to prevent the back flow of gasoline to the storage tank and to keep the suction line primed. This check valve is usually positioned at the lower end of the suction pipe.

Accordingly in the drawings, 5 designates a check valve casing threaded upon the lower end of the suction pipe and having the usual internal guide 6 for the shank 7 of a check valve 8. As shown, the lower end of the check valve casing is internally threaded to receive an externally threaded sleeve 9 of reduced diameter and extending upwardly from the upper end of the water locking valve casing 10 constituting the subject matter of the present invention. Conveniently, the upper inner edge of this sleeve 9 may be formed with an upstanding ridge 11 providing a valve seat engageable by the check valve 8 although this is a matter of convenience in manufacture and connection of the water locking valve casing and the check valve casing and does not enter into the construction of the water locking valve per se, the threaded sleeve 9 with its valve seat 11 merely constituting one means of connecting the upper end of the water locking valve casing with the lower end of the usual suction pipe represented by the check valve casing 5.

The water locking valve constituting the subject matter of the present invention forms the lower portion of the structure shown in Figures 2 and 3 and comprises the upper tubular section 10 with its sleeve extension 9 which terminates at its lower end in a flange 12 engaging the lower edge of the check valve or suction pipe casing 5. This tubular section 10 provides a vertical bore 13 alining with the bore of the check valve casing 5 and suction pipe 4 edged at its lower end by a boss 14 constituting a valve seat with its upper edge traversed by one or more notches 15, the purpose of which will be hereinafter disclosed. Depending from the lower face of the tubular portion 10 of the casing and supported by depending studs 16 is a baffle plate 17 with its upper face extending substantially in parallel with the face of the valve seat 14 and spaced therefrom a sufficient distance to provide an external intake area greater than that of the bore 13. The upper face of this baffle plate in conjunction with the confronting face of the tubular portion 10 provides an annular laterally extending suction intake with the lateral intake joining the vertical bore 13 at the valve seat 14 and with the external intake surface area of this lateral passage having the characteristics above described. This baffle plate provides for the indrawing or suction of gasoline laterally through the suction intake provided by the tubular portion 10 and the baffle plate 17 and upwardly through the bore 13 to the suction line.

Below and in line with the valve seat 14 the upper face of the baffle plate is formed with a circular depression or recess 18 having a central stem guiding bore 19 therethrough and an adjacent drainage opening 20. This baffle plate forms the lower edge of the lateral suction intake and the upper end of a float cage. A series of studs 21 depending from the under face of the baffle plate 17 and arranged to define points substantially equidistant in common circumference, support at their lower ends a base plate 22 having an inlet opening 23 therein. These studs as shown have their longitudinal axes substantially tangent to the circular edge of the depression 18 and provide open sides for the float cage through which water or hydrocarbon may freely enter.

Confined within these studs and guided thereby for vertical movement is a float 24 preferably hollow and of metal such as brass, having a diameter slightly less than that of the circle defined by said studs with its sides well within the outer edges of the baffle plate. The lower end of a valve stem 25 is affixed to this float and extends vertically upward through the guiding bore 19 of the baffle plate and is fixed to a disk valve 26.

This valve disk has a diameter slightly less than that of the depression 18 and is intended, with gasoline only in the tank, to rest upon the face of the depression 18 with its upper face below the plane of the upper face of the baffle plate as shown in Figure 2. The connected valve stem and float have a specific gravity greater than that of the gasoline and normally tends to sink therein, the float with its valve stem being thereby suspended below and supported from the baffle plate by means of the disk valve resting thereon.

Gasoline pumping suction through the suction pipe 4 and its check valve casing 5 is prevented from acting on the float because of the interposed baffle plate and the lateral suction intake provided causes the gasoline to be drawn into the casing 5 from the sides of the casing.

Because the intake surface area of this lateral intake is greater than that of the vertical bore 13 a greater volume of liquid is drawn in than can rise through the vertical bore 13, thereby offsetting and neutralizing the tendency of the liquid updrawn through the bore 13 to lift the valve 26 upwardly toward the valve seat 14. The specific gravity of the valve 26, stem 25 and float 24, with the tank, or at least the lower portion, filled with gasoline, causes the float and its attached valve to sink therein holding the valve to the face of the depression 18 with its upper face below the plane of the upper face of the baffle plate and out of the direct line of lateral suction intake.

In order that practically all gasoline, with a lower strata of water in the tank by leakage, accident, etc., may be drawn out before the suction line is closed or locked by water through valve 26, the specific gravity of the valve, stem and float are, preferably, prefigured to make the float and valve buoyant when the strata of water has reached a height approximating the top of the float, although by "immersion" I do not intend to so limit and restrict myself in this particular.

Assuming, however, that a strata of water has collected at the bottom of the tank and has risen approximately to the top of the float in its completely lowered position as shown in Figure 2, the float and its attached valve now become buoyant and the valve lifts from the depression 18 of the baffle plate. With gasoline discharging suction now operating in the suction pipe 4, the gasoline indrawn through the lateral intake penetrates beneath the disk valve 26 and the suction up through the bore 13 quickly lifts the valve to contact the valve seat 14 and closes the suction intake, thereby locking the discharging pump.

This acts to warn the pump operator that water is present in the storage tank. To permit the pump to again operate, it is necessary to insert a pump, such as a bilge pump, through the filler pipe to draw the water from the bottom of the tank. When this has been effected, the notch 15 in the edge of the valve seat boss 14 permits the valve 26 with its float to again drop to its normal position as shown in Figure 2. Any liquid caught in the depression 18 will have drained out through the opening 20 and permit the valve to drop to the bottom of the depression. The notch or notches 15 are necessary to allow the valve 26 to drop since otherwise the suction in the pipe line 4 and valve casing 5 will operate to hold the valve on its seat for an appreciable time before leakage will break the vacuum and release the valve.

I have not described the operation of the check valve in conjunction with the operation of the water locking valve since it has no effect upon the operation of the latter and functions only in the usual manner, lifting and opening in response to upward suction and dropping and seating or closing when suction ceases, to retain the gasoline in the suction line against draining back to the tank, thereby keeping the suction line primed for the pumping operation.

It will be evident that with the water locking safety valve of my invention, the suction of water upwardly through a gasoline or other fuel suctioning discharge line is absolutely prevented.

The business integrity of the seller of the gasoline is maintained and protected; the good reputation of the product sold is not injured by the harmful and accidental presence of water therein; and damage to the motors of vehicles, and annoyance to their owners, resulting from the accidental presence of water in their gasoline, is prevented.

From the standpoint of a gasoline pump owner further advantage is secured in that the fine dirt, scale, etc., which is frequently present in gasoline and settles in the bottom strata of water, cannot be drawn up in the suction line to get upon the check valve seat and prevent its full closing, thereby draining the gasoline from the suction line and making it necessary to disconnect the latter from the pump for repriming before the pump can again operate. Frequently also, the dirt so injures the check valve and valve seats as to require regrinding and refacing with the necessary excavation of earth or concrete to reach the buried storage tank and withdraw the suction pipe from its interior.

The structural features of the water locking valve herein described and shown represent a preferable and practical form of the invention, but are intended as illustrative rather than restrictive thereof, and are subject to variation and adaptation in consonance with the spirit of the invention and the scope of the appended claims.

What I claim, therefore, and desire to secure by Letters Patent is:

1. A water locking safety valve for the lower end of suction pipes of hydrocarbon fuel storage tanks having a casing provided with a bore therein communicating with the lower end of the suction pipe edged at its lower end with a valve seat and laterally extended to provide a lateral suction intake opening, a baffle plate at the lower side of said lateral suction opening, a valve supported on said baffle plate and positioned to cooperate with said valve seat, said valve having a stem depending through the baffle plate, and a float affixed to the lower depending end of said stem and shielded from suction at said lateral intake by the baffle plate, the combined specific gravity of the valve stem and float being greater than that of hydrocarbon fuel but providing for buoyancy thereof in water.

2. A water locking safety valve for the lower end of suction pipes of hydrocarbon fuel storage tanks comprising a casing having a bore alining and communicating with the suction pipe and provided with a lateral suction intake at its lower end surmounted by a valve seat, a float supported below said lateral intake, a baffle plate at the lower side of said lateral intake interposed between said intake and float, a valve supported on the upper face of the baffle plate to cooperate with said valve seat having a stem depending therethrough and affixed to said float, the combined specific gravity of the valve, stem and float being such as to cause them to sink in hydrocarbon fuel but to become buoyant in water, the baffle shielding the float from the suction of the lateral intake until such time as the float and its valve become buoyant through immersion of the float in water with the valve lifting from the baffle plate and subjected to the suction at the lateral intake drawing it to its seat.

3. A water locking safety valve for the lower end of suction pipes of hydrocarbon fuel storage tanks having a casing provided with a lateral suction opening communicating with a vertical bore alining with the lower end of the suction pipe and with a valve seat edging the lower end of said vertical bore, a float cage supported below said lateral intake and having open sides, a float confined in and guided by said cage for vertical movement, a baffle plate at the uper end of said cage forming the lower side of said lateral suction intake and shielding said float from the suction at said intake, a valve stem affixed to said float and extending upwardly through a guiding bore in the baffle plate, and a valve affixed to the upper end of said stem in position to cooperate with said valve seat, said valve seating upon the upper face of said baffle plate and supporting the float and its stem therefrom, the combined specific gravity of the valve, stem and float being greater than that of hydrocarbon fuel but providing for buoyancy thereof in water.

4. A water locking safety valve for the lower end of suction pipes of hydrocarbon fuel storage tanks having a casing provided with an open side valve cage at its lower end, a tubular portion at its upper end having a vertical bore therein alining with the lower end of the suction pipe and edged at its lower end with a valve seat, a baffle plate fixedly suspended below the lower end of said upper section and determinately spaced therefrom, said baffle plate constituting the upper end of the float cage and presenting with the lower end of the upper casing section an annular lateral suction intake having a surface area greater than that of the vertical bore of said section and having its upper face recessed in line with the valve seat thereabove, a valve seated in said recess to lie below the plane of the upper face of the baffle plate and having a stem depending through a guiding bore therein, a float confined in and guided for vertical movement in said float cage and having the lower end of said valve stem affixed thereto, the specific gravity of said valve, stem and float being greater than that of hydrocarbon fuel but providing for buoyancy thereof with the float immersed in water, said immersion lifting said valve and subjecting it to upward suction at the lateral suction intake effective to lift it to engage the valve seat.

5. A water locking safety valve for the lower end of suction pipes of hydrocarbon fuel storage tanks having a casing provided with an open side valve cage at its lower end, a tubular portion at its upper end having a vertical bore therein alining with the lower end of the suction pipe and edged at its lower end with a valve seat, a baffle plate fixedly suspended below the lower end of said upper section and determinately spaced therefrom, said baffle plate constituting the upper end of the float cage and presenting with the lower end of the upper casing section an annular lateral suction intake having a surface area greater than that of the vertical bore of said section and having its upper face recessed in line with the valve seat thereabove, a valve seated in said recess to lie below the plane of the upper face of the baffle plate and having a stem depending through a guiding bore therein, a float confined in and guided for vertical movement in said float cage and having the lower end of said valve stem affixed thereto, the specific gravity of said valve, stem and float being greater than that of hydrocarbon fuel but providing for buoyancy thereof with the float immersed in water, said immersion lifting said valve and subjecting it to upward suction at the lateral suction intake effective to lift it to engage the valve seat, the edge of said valve seat having a vacuum breaking slot therein permitting subsequent release of the valve and said baffle plate having its valve recess provided with a drainage bore therethrough.

6. A water locking safety valve for the lower end of suction pipes of hydrocarbon fuel storage tanks comprising a casing having an upper section formed for attachment to the lower end of a suction pipe and provided with an alined vertical bore therein edged at its lower end by a valve seat, a baffle plate depending from said upper section and determinately spaced from said valve seat to provide an annular laterally extending suction intake opening communicating with said vertical bore at the valve seat and with an intake surface area greater than that of said vertical bore, a float cage depending from said baffle plate having open sides, a float confined in and guided by said cage for vertical movement therein, a valve seating on the upper face of said baffle plate below the valve seat and having a stem depending through a guiding bore in the baffle plate and affixed to said float, said valve stem and float having a combined specific gravity greater than that of hydrocarbon fuel and providing for buoyancy thereof by immersion of the float in water serving to lift the valve from said baffle plate for suction upwardly to engage the valve seat and close the suction intake therethrough.

7. A water locking safety valve for the lower end of suction pipes of hydrocarbon fuel storage tanks comprising a casing formed at its upper end for connection to the lower end of the suction pipe and having an alining vertical bore therein edged at its lower end by a valve seat, a lateral annular suction intake opening therebelow communicating with said bore at the valve seat and of greater intake surface area than the diameter of said vertical bore, a baffle plate having its upper face forming the lower edge of said annular suction intake and provided with a recess therein alined with said valve seat and with a valve stem bore through said recessed portion, a float cage depending from said baffle plate having open sides and shielded by said baffle plate from suction at said lateral suction intake, a float confined in and guided by said cage for vertical movement, a disk valve seating in said baffle recess having a stem depending through its bore and affixed to said float, said valve stem and float having a combined specific gravity greater than that of hydrocarbon but providing for buoyancy thereof through immersion of the float in water, said valve being lifted from said recess through such buoyancy and subjected to the suction at said lateral intake and moved upwardly by said suction to engage said valve seat and close off suction therethrough.

8. A water locking safety valve for the lower end of suction pipes of hydrocarbon fuel storage tanks comprising a casing having a tubular upper portion presenting a bore alining with said suction pipe and edged at its lower end by a valve seat, a baffle plate suspended from the lower end of said tubular portion and determinately spaced therefrom to provide a lateral suction intake communicating with said bore at the valve seat and having a greater intake surface area than said bore, said baffle plate in alinement with said valve seat having a depression therein and a valve stem bore through said depression, a valve seating in said depression below the plane of the upper face of the baffle plate, a stem depending from said valve through the bore in the baffle plate and affixed at its lower end to a float having a baffle plate shielded thereby against suction at said lateral intake, the specific gravity of said valve, stem and float being such as to cause it to sink in hydrocarbon fuel but to become buoyant through the immersion of the float in water, the greater surface area of the lateral intake opening preventing upward suction of said valve until such time as immersion of its attached float in water renders it buoyant and causes suction through said lateral intake to draw it upwardly to said seat to cut off suction therethrough.

9. A water locking safety valve for the lower end of suction pipes for hydro-carbon fuel storage tanks comprising a casing presenting a vertical bore alining with the suction pipe and edged at its lower end by a valve seat, a baffle plate underlying the lower end of said bore in determinately spaced relation thereto providing a lateral suction intake communicating with said bore at the valve seat and having a greater intake surface area than said bore, said baffle plate in alinement with said valve seat having a depression therein and a valve stem bore through said depression, a valve seating in said depression below the plane of the upper face of the baffle plate and having a stem depending through said bore, and a float affixed to the lower end of said stem below said baffle plate and having its transverse area of less extent than that of said baffle plate to lie within the vertically projected edges thereof and be shielded by said edges against suction from said lateral suction intake, the specific gravity of said valve, stem and float being such as to cause it to sink in hydrocarbon fuel but to become buoyant through the immersion of the float in water, the greater surface area of the lateral intake preventing upward suction of said valve until such time as immersion of its attached float in water renders it buoyant and causes suction through said lateral intake upwardly through the suction pipe to draw it upwardly to said valve seat to cut off suction therethrough.

Signed at the city of Washington, in the District of Columbia, this 7th day of February, A. D. 1929.

JOHN HYDE VIELE.